(12) United States Patent
Burd et al.

(10) Patent No.: US 11,866,175 B2
(45) Date of Patent: Jan. 9, 2024

(54) WASTE COMPARTMENT SYSTEMS FOR AIRCRAFT

(71) Applicant: B/E Aerospace, Inc., Winston Salem, NC (US)

(72) Inventors: Peter Burd, Burry Port (GB); Ray Hough, Winston-Salem, NC (US)

(73) Assignee: B/E Aerospace, Inc., Winston Salem, NC (US)

( * ) Notice: Subject to any disclaimer, the term of this patent is extended or adjusted under 35 U.S.C. 154(b) by 234 days.

(21) Appl. No.: 17/364,380

(22) Filed: Jun. 30, 2021

(65) Prior Publication Data

US 2022/0001986 A1 Jan. 6, 2022

Related U.S. Application Data

(60) Provisional application No. 63/047,057, filed on Jul. 1, 2020.

(51) Int. Cl.
| | |
|---|---|
| *B64D 11/02* | (2006.01) |
| *B64D 11/04* | (2006.01) |
| *G08B 17/10* | (2006.01) |
| *A62C 3/08* | (2006.01) |
| *B64D 45/00* | (2006.01) |

(52) U.S. Cl.
CPC .............. *B64D 11/02* (2013.01); *B64D 11/04* (2013.01); *G08B 17/10* (2013.01); *A62C 3/08* (2013.01); *B64D 2045/009* (2013.01)

(58) Field of Classification Search
CPC ...... G01S 15/004; G01S 15/104; G01S 7/527; G01S 15/58; G06N 20/00; G06N 3/045; G06F 3/0416; G06F 3/04186; G06F 17/14; G06F 2218/08; G06F 2218/12
See application file for complete search history.

(56) References Cited

U.S. PATENT DOCUMENTS

| | | | | |
|---|---|---|---|---|
| 8,225,458 | B1 * | 7/2012 | Hoffberg ................. | E05F 15/73 16/84 |
| 2008/0030328 | A1 * | 2/2008 | Sharma .................. | G08B 13/08 340/552 |
| 2009/0018673 | A1 * | 1/2009 | Dushane .............. | G05B 19/042 700/9 |

FOREIGN PATENT DOCUMENTS

| | | |
|---|---|---|
| CN | 111003411 A | 4/2020 |
| EP | 3659918 A1 | 6/2020 |
| WO | 2017/098572 A1 | 6/2017 |

OTHER PUBLICATIONS

Extended European Search Report issued in corresponding European Patent Application No. EP 21183289.4, dated Dec. 7, 2021.

\* cited by examiner

*Primary Examiner* — Ojiako K Nwugo
(74) *Attorney, Agent, or Firm* — Locke Lord LLP; Daniel J. Fiorello

(57) ABSTRACT

A waste compartment system for an aircraft can include a motor operated door and a proximity sensor configured to sense an object near the door or approaching the door. The system can include a control module operatively connected to the proximity sensor and configured to open the door in response to the proximity sensor sensing an object near the door. The control module can be configured to close the door after a preset time after the proximity sensor senses an object.

13 Claims, 4 Drawing Sheets

Fig. 1A
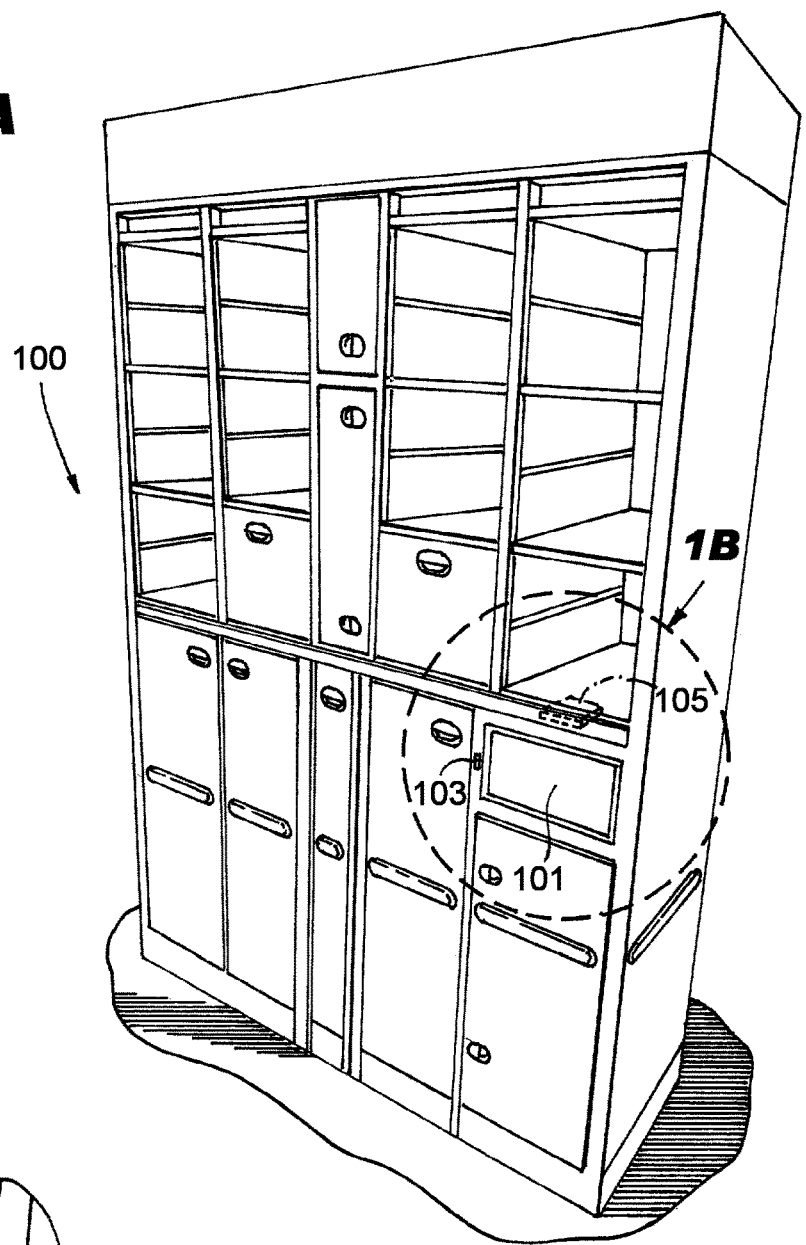
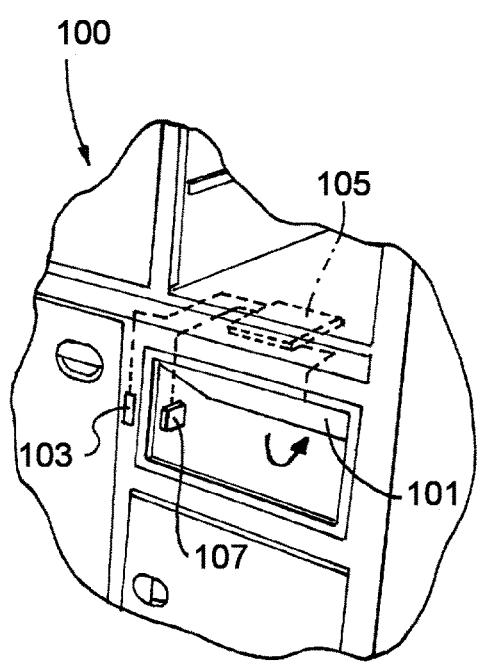
Fig. 1B

WASTE COMPARTMENT SYSTEMS FOR AIRCRAFT

CROSS-REFERENCE TO RELATED APPLICATIONS

This application claims priority to and the benefit of U.S. Provisional Application No. 63/047,057, filed Jul. 1, 2020, the entire contents of which are herein incorporated by reference in their entirety.

FIELD

This disclosure relates to waste compartment systems for aircraft.

BACKGROUND

The risk of contamination of viral pathogens such as COVID-19 is increased when potentially contaminated meal service waste and/or personal protective equipment is stored in galley waste compartment. Traditional waste bins on aircraft have a flap has to be pushed open manually, and in order to contain a fire, is spring loaded to automatically close. Jamming the flap open is prohibited. There is a danger of the flap becoming contaminated by repeated touching and spreading the infection between cabin crew and passengers.

Conventional methods and systems have generally been considered satisfactory for their intended purpose. However, there is still a need in the art for improved waste compartment systems for aircraft. The present disclosure provides a solution for this need.

SUMMARY

A waste compartment system for an aircraft can include a motor operated door and a proximity sensor configured to sense an object near the door or approaching the door. The system can include a control module operatively connected to the proximity sensor and configured to open the door in response to the proximity sensor sensing an object near the door. The control module can be configured to close the door after a preset time after the proximity sensor senses an object. The system can include a fire detection device operatively connected to the control module and configured to indicate the presence of a fire within a waste compartment associated with the waste compartment system. The control module can be configured to close the door and to disable the proximity sensor and/or to disable the door regardless of the proximity sensor when a fire is indicated by the fire detection device.

The proximity sensor can be disposed at about 90 degrees relative to the normal vector of the door to have a field of view across the door to allow sensing of an object approaching the door substantially along the normal vector of the door. Any other suitable position is contemplated herein to facility touchless operation of the door.

The fire detection device can include a temperature sensor and/or a smoke detector. Any suitable fire detection device is contemplated herein.

Certain embodiments can include the waste compartment. The waste compartment can be configured to fit within an aircraft galley or an aircraft lavatory. The fire detection device can be disposed within the waste compartment.

In accordance with at least one aspect of this disclosure, an aircraft can include a waste compartment system for an aircraft. The waste compartment system can be as disclosed herein, e.g., as described above.

In accordance with at least one aspect of this disclosure, a non-transitory computer readable medium comprising computer executable instructions configured to cause a computer to execute a method. The method can include determining that there is a fire in a waste compartment, and closing and/or locking a motor operated door of the waste compartment to contain the fire. The method can further include locking the motor operated door of the waste compartment such that the motor operated door will not open after a fire is detected. The method can include any other suitable method(s) and/or portion(s) thereof.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein:

FIG. 1A is a schematic diagram of an embodiment of a waste compartment system in accordance with this disclosure, shown embodied on a galley waste compartment and in the closed position;

FIG. 1B is a schematic diagram of the embodiment of FIG. 1A, shown in the open position;

DETAILED DESCRIPTION

Figure 2:
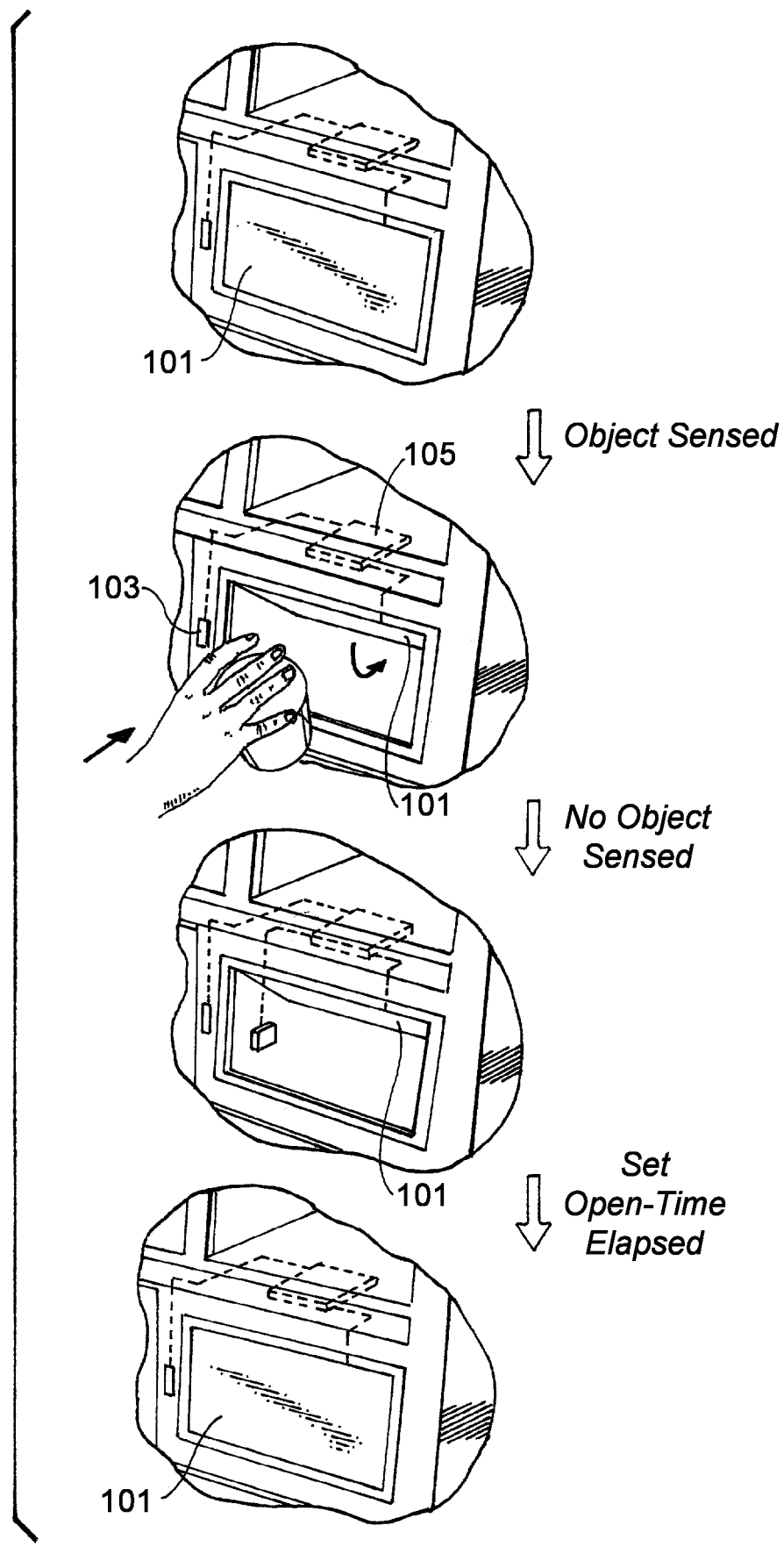
FIG. 2 shows an embodiment of a normal operation of the embodiment of FIG. 1A.
Figure 3:
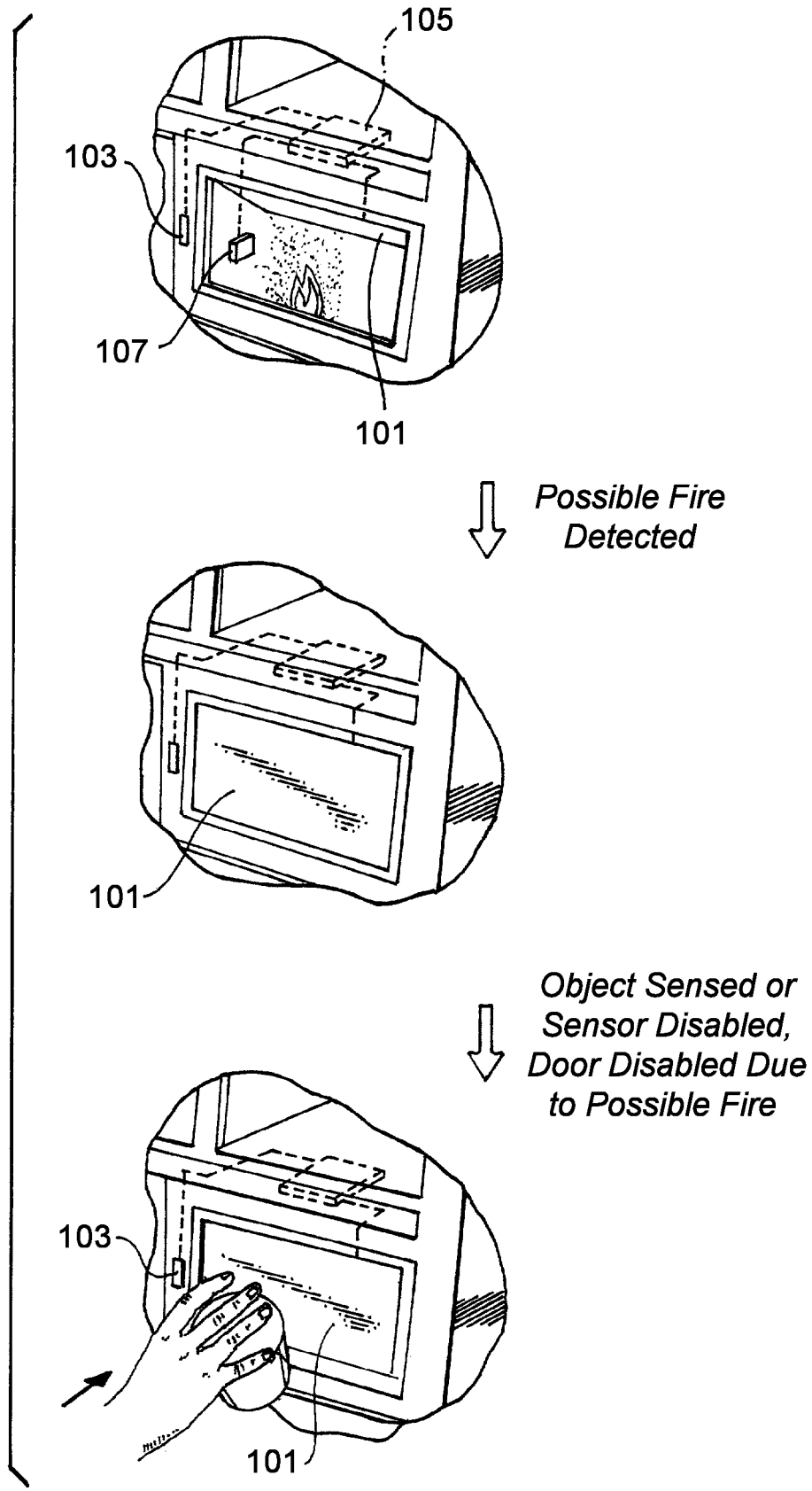
FIG. 3 shows an embodiment of a fire-detected operation of the embodiment of FIG. 1A.
Figure 4:
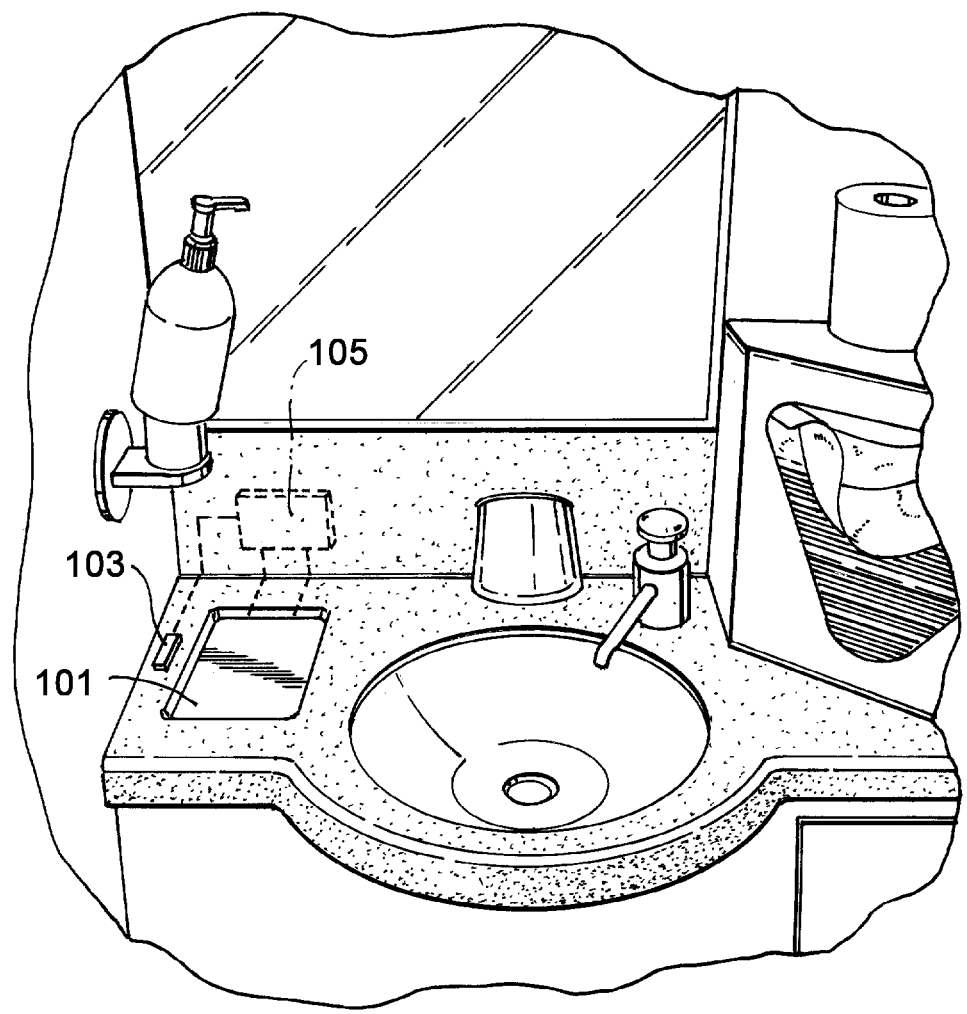
FIG. 4 shows the system of FIG. 1 applied to a lavatory waste compartment in accordance with this disclosure.

Reference will now be made to the drawings wherein like reference numerals identify similar structural features or aspects of the subject disclosure. For purposes of explanation and illustration, and not limitation, an illustrative view of an embodiment of a waste compartment system in accordance with the disclosure is shown in FIGS. 1A and 1B, and is designated generally by reference character 100. Other embodiments and/or aspects of this disclosure are shown in FIGS. 2-4. Certain embodiments described herein can be used to provide touchless waste compartments that are also fire safe per aviation requirements, for example.

Referring to FIGS. 1A and 1B, a waste compartment system 100 for an aircraft (not shown) can include a motor operated door 101 and a proximity sensor 103 configured to sense an object (e.g., a user hand or other item) near the door 101 or approaching the door 101. The system 100 can include a control module 105 operatively connected to the proximity sensor 103 and the door 101. As shown in FIG. 2, the control module 105 can be configured to open the door 101 in response to the proximity sensor 103 sensing an object near the door 101. As further shown in FIG. 2, the control module 105 can be configured to close the door 101 after a preset time (e.g., about 10 seconds or any other suitable time) after the proximity sensor 103 senses an object (e.g., after a last time an object was sensed). Any suitable motor (not specifically shown) can be attached to the door 101 that is configured to be operated by the control module 105.

The proximity sensor 103 can be disposed at about 90 degrees relative to the normal vector (orthogonal to a plane) of the door 101 to have a field of view across the door 101 to allow sensing of an object approaching the door 101 substantially along the normal vector of the door 101, for example. This can ensure anything coming close to the door 101 is sensed before the door 101 is contacted. Any other suitable position is contemplated herein to facility touchless operation of the door.

In certain embodiments, as shown in FIG. 1B, the system 100 can include a fire detection device 107 operatively connected to the control module 105 and configured to indicate the presence of a fire within a waste compartment 109 associated with the waste compartment system 100. Any suitable fire detection device is contemplated herein. For example, the fire detection device 107 can include a temperature sensor and/or a smoke detector. The control module 107 can be configured to determine that there is a fire if the temperature sensor indicates temperature above a set threshold (e.g., 110 degrees F.). Any suitable sensor type (e.g., a chemical sensor) and/or control logic is contemplated herein.

Certain embodiments can include the waste compartment 109. The waste compartment 109 can be configured to fit within an aircraft galley (e.g., as show in FIGS. 1A-3) or an aircraft lavatory (hidden in FIG. 4). The fire detection device 107 can be disposed within the waste compartment 109, for example. As shown in FIG. 3, in the event of a fire being indicated by the fire detection device 107, the control module 105 can be configured to close the door 101 (if open) and to disable the proximity sensor 103 and/or to disable the door 101 regardless of the proximity sensor 103. In this regard, the door 101 cannot be opened in the event of a detected fire. Certain embodiments can include an audio and/or visual fire alert activated by the control module 105 (e.g., connected to an alarm). Certain embodiments can include a fire suppression capability controlled by the control module 105.

As shown in FIG. 4, embodiments can be applied to a lavatory waste compartment. Any other suitable changes to be utilized in a lavatory are contemplated herein. Any other suitable locations of use for embodiments disclosed herein is contemplated herein.

In accordance with at least one aspect of this disclosure, an aircraft (not shown) can include a waste compartment system for an aircraft. The waste compartment system can be as disclosed herein, e.g., system 100 as described above.

In accordance with at least one aspect of this disclosure, a non-transitory computer readable medium comprising computer executable instructions configured to cause a computer to execute a method. The method can include determining that there is a fire in a waste compartment, and closing and/or locking a motor operated door of the waste compartment to contain the fire. The method can further include locking the motor operated door of the waste compartment such that the motor operated door will not open after a fire is detected. The method can include any other suitable method(s) and/or portion(s) thereof. The control module 101 can include any suitable hardware and/or software module(s) configured to perform any function disclosed herein (e.g., described above) and can include the non-transitory computer readable medium.

Embodiments can include a touchless aircraft galley/lavatory waste compartment flap. Embodiments can include an actuator operated no-touch waste compartment flap using a proximity sensor placed at right-angles to the flap's surface in order to detect an approaching hand or object and automatically open the flap. Closure can be timed to operate the flap after a set amount of seconds of non-detection of an approaching object. In order to comply with the airworthiness fire regulations, the device can incorporate a failsafe heat and/or optical smoke detection system that can automatically close the flap and disable the proximity sensor preventing accidental or intentional efforts to open the flap. An optional audio visual fire alert can also be supplied along with a fire suppression capability.

Embodiments can prevent touch contamination from bare or gloved hands or from objects that have been in contact with viruses such as COVID-19 or bacteria such as *Listeria*. Frequent cleaning of the flap with chemicals would not be necessary which is disruptive for flight attendants and unreliable. Fire safety regulations can be met because of the auto failsafe closure capability and/or fire suppression. Embodiments can also be retrofitted to existing aircraft, e.g., with power made available.

Traditionally, there is a risk of hand contamination for flight attendants through the requirement to touch the surface of a waste bin flap. There is also a contamination risk and poor hygiene for passengers using a lavatory waste bin flap, for example. Certain embodiments remedy these issues and can increase the safety of cabin crew, can be retrofitted, can incorporate automatic closure and disablement of the external sensor if a waste bin fire is detected, and would not only protects against viral infection but would be generally more hygienic to use. Embodiments can do this by providing "touchless" proximity sensing waste bin flaps on galleys and in lavatories of aircraft, for example.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:
1. A waste compartment system for an aircraft, comprising:
   a motor operated door;
   a proximity sensor configured to sense an object near the door or approaching the door;

a control module operatively connected to the proximity sensor and configured to open the door in response to the proximity sensor sensing an object near the door, wherein the control module is configured to close the door after a preset time after the proximity sensor senses an object;

a fire detection device operatively connected to the control module and configured to indicate the presence of a fire within a waste compartment associated with the waste compartment system, wherein the control module is configured to close the door and to disable the proximity sensor and/or to disable the door regardless of the proximity sensor when a fire is indicated by the fire detection device.

2. The system of claim 1, wherein the proximity sensor is disposed at about 90 degrees relative to the normal vector of the door to have a field of view across the door to allow sensing of an object approaching the door substantially along the normal vector of the door.

3. The system of claim 1, further comprising a fire detection device operatively connected to the control module and configured to indicate the presence of a fire within a waste compartment associated with the waste compartment system.

4. The system of claim 3, further comprising the waste compartment, wherein the waste compartment is configured to fit within an aircraft galley or an aircraft lavatory.

5. The system of claim 1, wherein the fire detection device includes a temperature sensor.

6. The system of claim 1, wherein the fire detection device includes a smoke detector.

7. An aircraft, comprising:
a waste compartment system for an aircraft, comprising:
a motor operated door;
a proximity sensor configured to sense an object near the door or approaching the door;
a control module operatively connected to the proximity sensor and configured to open the door in response to the proximity sensor sensing an object near the door, wherein the control module is configured to close the door after a preset time after the proximity sensor senses an object; and a fire detection device operatively connected to the control module and configured to indicate the presence of a fire within a waste compartment associated with the waste compartment system, wherein the control module is configured to close the door and to disable the proximity sensor and/or to disable the door regardless of the proximity sensor when a fire is indicated by the fire detection device.

8. The aircraft of claim 7, wherein the proximity sensor is disposed at about 90 degrees relative to the normal vector of the door to have a field of view across the door to allow sensing of an object approaching the door substantially along the normal vector of the door.

9. The aircraft of claim 8, further comprising the waste compartment, wherein the waste compartment is configured to fit within an aircraft galley or an aircraft lavatory.

10. The aircraft of claim 9, wherein the fire detection device is disposed within the waste compartment.

11. The aircraft of claim 10, wherein the fire detection device includes a temperature sensor.

12. The aircraft of claim 10, wherein the fire detection device includes a smoke detector.

13. A non-transitory computer readable medium comprising computer executable instructions configured to cause a computer to execute a method, the method comprising:
determining that there is a fire in a waste compartment;
closing and/or locking a motor operated door of the waste compartment to contain the fire; and
locking the motor operated door of the waste compartment such that the motor operated door will not open after a fire is detected.

* * * * *